United States Patent [19]

Honda et al.

[11] Patent Number: 4,548,488

[45] Date of Patent: Oct. 22, 1985

[54] CONVERSION LENS ASSEMBLY FOR AN AUTOMATIC FOCUSING SYSTEM IN A LENS EXCHANGEABLE CAMERA

[75] Inventors: Yasuhisa Honda; Makoto Ando, both of Sakai, Japan

[73] Assignee: Minolta Camera Kabushiki Kaisha, Osaka, Japan

[21] Appl. No.: 552,213

[22] Filed: Nov. 15, 1983

[30] Foreign Application Priority Data

Nov. 19, 1982 [JP] Japan .................. 57-204224
Apr. 11, 1983 [JP] Japan .................. 58-64184

[51] Int. Cl.$^4$ ................................. G03B 3/10
[52] U.S. Cl. .................................. 354/402; 354/286
[58] Field of Search ........... 354/167, 286, 289.12, 354/400, 401, 402, 406, 407, 408, 403, 404, 405, 295; 350/252, 255, 257

[56] References Cited

U.S. PATENT DOCUMENTS

| | | | |
|---|---|---|---|
| 3,566,765 | 3/1971 | Nagashima | 350/422 |
| 3,879,741 | 4/1975 | Saito et al. | 354/295 |
| 4,182,563 | 1/1980 | Biber et al. | 354/401 |
| 4,329,040 | 5/1982 | Fukino et al. | 354/286 |
| 4,477,164 | 10/1984 | Nakai et al. | 354/286 |

FOREIGN PATENT DOCUMENTS 55-127524 10/1980 Japan .
57-165821 10/1982 Japan .

Primary Examiner—L. T. Hix
Assistant Examiner—David M. Gray
Attorney, Agent, or Firm—Wolder, Gross & Yavner

[57] ABSTRACT

An automatic focusing system in a lens exchangeable camera is adapted to use a conversion lens assembly, in which a drive transmission mechanism is provided between an intermediate driven member capable of being coupled with a driving output member of a camera body and an intermediate driving member capable of being coupled with a driven member of an exchangeable lens assembly, for transmitting movement of the intermediate driven member to the intermediate driving member with a predetermined transmission coefficient $\mu c$.

In use, the conversion lens assembly is interposed between the camera body and the exchangeable lens assembly. A control circuit of the camera body controls the rotation of a driving motor based on a focus condition signal obtained by focus condition detection and a data signal input from the exchangeable lens assembly for determining the amount and direction of the movement of the driving output member driven by the driving motor. The driven member of the exchangeable lens assembly is driven for displacing the focusing optical system through coupling with the intermediate driving member of the conversion lens assembly in response to the movement of the driving output member of the camera body. The data signal is related to a ratio of image plane displacement amount by the adjustment of the focusing optical system to the movement of the driven member.

The conversion lens assembly may be provided with a signal transmission system which transmits the above data signal to the control circuit with a predetermined transmission coefficient.

9 Claims, 14 Drawing Figures

IN PUT
OUT PUT

FIG. 8b

IN PUT
OUT PUT

CONVERSION LENS ASSEMBLY FOR AN AUTOMATIC FOCUSING SYSTEM IN A LENS EXCHANGEABLE CAMERA

BACKGROUND OF THE INVENTION

1. Field of the Invention

The present invention relates to a conversion lens assembly for an automatic focusing system to be used in a lens exchangeable camera and more particularly, to a conversion lens assembly which is to be interposed between a camera body having a driving motor driven in response to a signal from a focus condition detection means and a driving force output member driven by the motor, and an exchangeable lens assembly having a driven member capable of being coupled with the driving force output member of the camera body to shift a focusing optical system within the exchangeable lens assembly for focusing.

2. Prior Art

Conventionally, there have been proposed various automatic focusing systems for use in lens exchangeable type cameras. In such known automatic focusing systems, there is included a system in which a focus condition detection means, a driving motor driven responding to a signal therefrom and a driving force output member to be driven by the motor are provided in a camera body, while in an exchangeable lens assembly to be attached to the camera body, a driven member coupled with the driving force output member of the camera body is provided so as to displace the focusing optical system for focusing. In the system as described above, arrangements conventionally proposed are limited to the case where exchangeable lens assemblies are directly mounted on the camera body, and no particular countermeasures have been proposed with respect to cases where, for example, telephoto conversion lenses which increase focal lengths of photographic lenses by 1.4, 2, 3 times, etc. or wide angle conversion lenses which reduce such focal lengths to 1/1.4, ½, ⅓, etc. are mounted behind the exchangeable lens assemblies.

Incidentally, with respect to the focus condition detection methods at the side of camera bodies, there have also been proposed various systems up to the present, which may be broadly classified, in terms of principles, into a phase difference system as disclosed in U.S. Pat. No. 4,333,007 and a contrast system as disclosed in U.S. Pat. No. 4,341,953.

The phase difference system as referred to above is a system by which an amount of the so-called out-of-focus condition can be detected together with its direction (i.e. both direction and amount of deviation of an image plane from a predetermined image forming surface can be detected). In order to effectively utilize such a system for an automatic focusing system of a lens exchangeable camera, it is necessary that the extent for driving the driving force output member in the camera body with respect to the detected amount of the out-of-focus can be determined at the side of the camera body. More specifically, the driving amount of the driving force output member is determined by such factors as a ratio of the amount of shift of the focusing optical system in the exchangeable lens assembly to the amount of the out-of-focus, a pitch on a lead of the focusing optical system shifting mechanism such as a helicoid thread, etc., and a reduction gear ratio possessed by the driving transmission system and the like, and is specific according to the kinds of the exchangeable lens assemblies. However, in such a lens as a zoom lens of a front group displacing focusing system, etc., the ratio of the focusing optical system shift amount to the amount of out-of-focus is varied by the zooming of the lens.

As a countermeasure for the above, in the lens exchangeable camera which employs various exchangeable lens assemblies there may be considered such an arrangement which, with the factors as described above being applied to the respective exchangeable lens assemblies as signals, compensations for the control of the driving amount of the driving force output member by the signals introduced into the camera body upon attaching of the exchangeable lens assembly to the camera body. It may also be considered as another countermeasure that, with respect to the driving amount of the driving force output member at the camera body side, no difference is provided for any exchangeable lens assembly to be attached, and at the side of the individual exchangeable lens assemblies, the pitch or lead of the focusing optical system shift mechanism and the reduction gear ratio, etc. are so modified as to be common to all of the exchangebale lens assemblies.

However, in the case where a conversion lens assembly (referred to as a rear converter hereinafter) is interposed between the exchangeable lens assembly and the camera body, the entire focal length as a photographing optical system is altered from the focal length of the single exchangeable lens assembly alone to a composite focal length of the exchangeable lens assembly and the conversion lens, with the out-of-focus amount corresponding to the focal length thus composed, while, on the contrary, since the focusing must still be effected only by the shift of the focusing optical system of the exchangeable lens assembly, there will be no correspondence between the image plane variation in the camera body and the shift amount of the focusing optical system in the exchangeable lens.

The situation as described above similarly applies to the case where any of the above countermeasures is taken, and when the correspondence is broken to a large extent there may arise a situation where focusing becomes difficult or impossible.

In order to solve the problem as described above, it is considered to impart to the camera body by some methods, the ratio of the amount of shift of the focusing optical system to the amount of out-of-focus, which is proper to the case where the rear converter is attached between the exchangeable lens assembly and the camera body. However, in the case where the driving motor in the camera body is a step motor or a motor subjected to pulse driving, the minimum shift amount of the focusing optical system is determined in correspondence to the unit driving amount of the motor, and when the minimum extension amount is not altered even if the rear converter is interposed between the exchangeable lens assembly and the camera body, the minimum variation amount of the image plane on the film surface is altered as compared with the case where only the exchangeable lens assembly is attached to the camera body. Particularly in the case of a telephoto rear converter which increases the above composite focal length longer than the focal length only of the exchangeable lens assembly, since the ratio of the shift amount of the focusing optical system to the amount of out-of-focus becomes small, the minimum variation amount of the image plane grows larger, with a consequent deterioration in the focusing accuracy.

Meanwhile, there arises a similar problem also in the case where a focus detection system of the contrast type is adopted for an automatic focusing system of a lens exchangeable camera. More specifically, the contrast system is the system which is capable of detecting only the direction of the out-of-focus, and in the automatic focusing system of a lens exchangeable camera which adopts the above contrast system, when the focusing optical system of the lens is shifted by a step motor or a driving motor driven by pulses, problems as follows will be invited, if the minimum shift amount of the focusing optical system corresponding to the unit driving amount of the motor is not altered as compared with the case where only the exchangeable lens assembly is used, even when a rear converter is attached to the exchangeable lens assembly. In other words, in the actual system, there is present a time delay in a period from generation of a motor stopping signal following the focus detection to the actual stopping of the focusing optical system of the exchangeable lens assembly, and the image forming point undesirably overruns the predetermined image forming plane during that time. Particularly in the case of a telephoto converter, the amount of the overrun is enlarged, and therefore, it is possible that the focusing optical system undesirably passes through the focusing zone in spite of the generation of the motor stopping signal. In such a case, it becomes necessary to re-drive the driving motor in the opposite direction, thus resulting in an unpleasant feeling during use such as an unstable image in a viewfinder. Meanwhile, even on the assumption that the time delay from the generation of the motor stopping signal to the actual stopping of the focusing optical system is zero, since the amount of variation of the image forming position by the increment driving of the driving motor is also altered by the use of a rear converter, the focusing accuracy is lowered when a telephoto converter is used resulting in such an inconvenience that the focusing optical system does not stop within the focusing zone in many situations.

It is to be noted here that in the case where the focus detection of the phase difference system as described above is effected, if the countermeasures as explained are taken, the driving amount of the camera body side driving force output member can be preliminarily determined at the side of the camera body through focusing detection of one time (in the case where the relation between the shift amount of the focusing optical system and the out-of-focus amount is in an approximately linear relationship) and/or several times (in the case where the relation between the shift amount of the focusing optical system and the out-of-focus amount is non-linear), and therefore, there is an advantage in that an accurate focusing may be effected at high speeds. However, if the problems as stated previously should take place by the use of the rear converter, such advantage may be undesirably lost completely, and therefore, the problems as described so far are very serious especially for the automatic focusing system of a lens exchangeable camera in effecting the focusing detection of this system.

SUMMARY OF THE INVENTION

A primary object of the present invention is to provide an improved conversion lens assembly for an automatic focusing system in a lens exchangeable camera, by presenting a construction and a system which make it possible to effect an accurate automatic focusing, even in the case where the conversion lens assembly is interposed between an exchangeable lens assembly and a camera body.

Another important object of the present invention is to provide a conversion lens assembly of the above described type, which is simple in construction and stable in functioning, and which can be readily applied to lens exchangeable cameras of various kinds.

The conversion lens assembly (rear converter) according to the present invention is used by being interposed between a camera body having a driving motor, a driving output member driven by the driving motor, and a control circuit for controlling rotation of the driving motor based on a focus condition signal obtained by focus detection and a data signal input through an exchangeable lens assembly and the exchangeable lens assembly provided with a driven member driven for shifting the focusing optical system through coupling with the driving output member of the camera body, and a signal means having the data signal related to a ratio of image plane displacement by the adjustment of the focusing optical system to the movement of the driven member.

The conversion lens assembly according to the present invention is characterized in that a driving force transmission system for transmitting the movement of an intermediate driven member to an intermediate driving force output member with a predetermined transmission coefficient $\mu c (\neq 1)$, is provided between the intermediate driven member to be coupled with the driving force output member at the side of the camera body, and the intermediate driving force output member to be coupled with the driven member at the side of the exchangeable lens assembly.

The conversion lens assembly according to the present invention may be further provided with a signal transmission means for transmitting the data signal possessed by the signal means of the exchangeable lens assembly to the control circuit within the camera body with a predetermined transmission coefficient $\eta c (\neq 1)$.

DETAILED DESCRIPTION OF THE PREFERRED EMBODIMENTS

Figure 1:
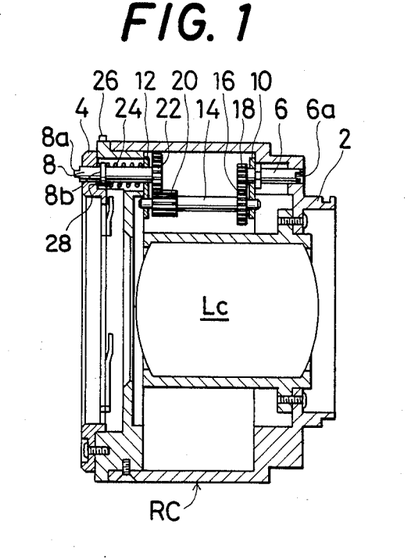
FIG. 1 is a side sectional view along an optical axis of a rear converter according to one preferred embodiment of the present invention.
Figure 2:
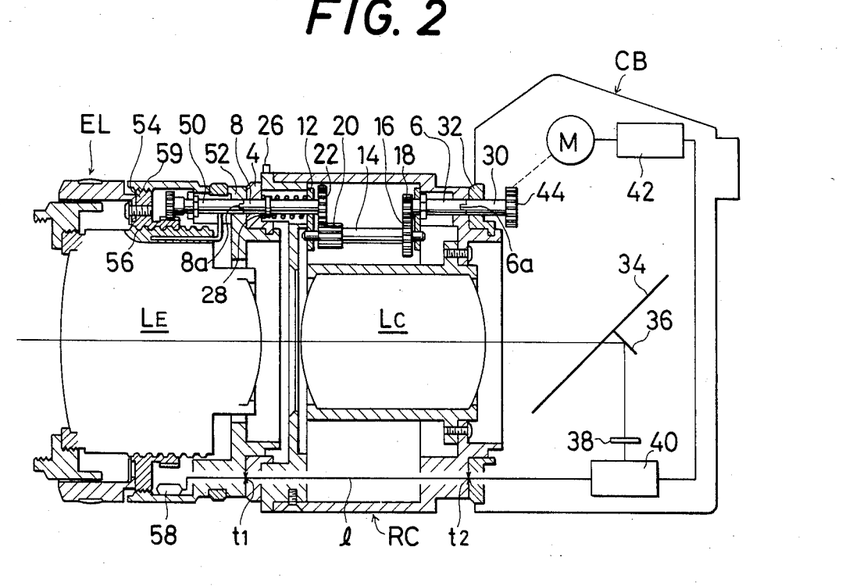
FIG. 2 is a side sectional view in which the rear converter of FIG. 1 is attached between a camera body and an exchangeable lens assembly.

Referring to FIGS. 1 and 2 showing one preferred embodiment according to the present invention, there is shown a rear converter RC provided therein with a rear converter lens system Lc. A bayonet mount member 2 at a rear side or film plane side (at the right in the drawings) and a bayonet mount seat 4 at a front side or object side, respectively constitute mounting means for attaching the rear converter RC to a camera body CB and an exchangeable lens assembly EL, respectively. There are coaxially disposed an intermediate driven shaft 6 and an intermediate driving force output shaft 8, and at the rear end of the intermediate driven shaft 6 there is formed a connecting recess 6a for engagement with a driving output shaft 30 of the camera body CB, while, at the forward end of the intermediate driving force output shaft 8, a connecting projection 8a is formed for engagement with a driven shaft 50 of the exchangeable lens assembly EL. The intermediate driven shaft 6 is journalled by the bayonet mount member 2 and a bearing plate 10, and at the forward end of the shaft 6 extending through the bearing plate 10, a gear 18 is fixed so as to be engaged with a gear 16 secured on a relay shaft 14 journalled by the bearing plate 10 and a bearing plate 12.

The intermediate driving force output shaft 8 journalled by the bayonet mount seat 4 and the bearing plate 12, has a gear 22 fixed at its rear end for engagement with another gear 20 secured on the relay shaft 14. Moreover, the intermediate driving force output shaft 8 is provided with a flange portion 8b, and by a spring 24 disposed between the flange portion 8b and the bearing plate 12, the shaft 8 being urged so that its projection 8a extends out of the bayonet mount seat 4. However, upon depression of a connection release button 26, since an association plate 28 associated with the button 26 through a mechanism (not shown) depresses the flange portion 8b backwardly, the intermediate driving force output shaft 8 is displaced against the spring 24 to a position where the projection 8a is retracted into the bayonet mount seat 4. The gear 16, 18, 20 and 22 constitute, together with the relay shaft 14, a driving force transmission system for transmitting the drive of the intermediate driven shaft 6 to the intermediate driving force output shaft 8, and when the rear converter lens system Lc functions as a telephoto converter, such gears are designed as a speed reduction system, while in the case where the lens system Lc acts as a wide angle converter, they are designed as a speed increasing system.

In FIG. 2 showing the state where the rear converter RC is mounted between the camera body CB and the exchangeable lens assembly EL, the camera body CB has its driving force output shaft 30 projecting from a mount seat 32 thereof, and includes a movable main mirror 34 for a single lens reflex camera, in which, for example, light passing through a light transmitting portion formed at its central portion is reflected by an auxiliary mirror 36 supported by the movable main mirror 34 so as to be incident upon a focus condition detection means 38. In this state, a light receiving surface of the focus condition detection means 38 is disposed at a predetermined plane conjugate with a film plane (not shown) of the camera body CB, i.e. at a position optically equivalent to a predetermined image forming plane, and in the case of this embodiment, the focus condition detection means 38 effects the focus condition detection of the phase difference system in the example as illustrated.

A focus condition detection circuit 40 produces a signal representive of the direction of the out-of-focus and a signal representative of the amount of the out-of-focus, based on the output of the focus condition detection means 38. These signals are fed to a control circuit 42 which controls the driving of a driving motor M, i.e., the driving direction and the driving amount of the motor. The motor M drives a gear 44 fixed to the driving force output shaft 30 through a proper gear train constituting a drive transmission system.

On the other hand, the exchangeable lens EL has a bayonet mount member 52 at its rear end, with a focusing optical system $L_E$ provided therein. In the example as illustrated, the focusing optical system $L_E$ is of a whole lens system shifting type, in which all the lens groups constitute the focusing optical system. The rotation of a driven shaft 50 is transmitted to a helicoid thread member 54 constituting a focusing optical system shifting mechanism through a gear train constituting a driving force transmission system, and by the rotation of this member 54, the focusing optical system $L_E$ is shifted in the direction of the optical axis by means of helicoid threads 56 and 59.

Incidentally, into the focus condition detection circuit 40 within the camera body CB, information inherent in the exchangeable lens assembly EL is introduced through the rear converter RC. More specifically, in the exchangeable lens EL, there is provided, for example, a ROM 58 (Read only memory) as an information source, in which a value $K_M$ inherent in the exchangeable lens is stored. Here, $K_M$ denotes the ratio of the number of revolutions of the driven shaft 50 to the amount of out-of-focus, and is represented by the following equation:

$$K_M = \frac{\kappa_M}{l_M \cdot \mu_M}$$

where $\kappa_M$: ratio of the shift amount of the focusing optical system $L_E$ to the amount of out-of-focus, $\mu_M$: gear ratio of the driving force transmission system; $\mu M < 1$ for speed reducing system, $\mu M > 1$ for speed increasing system $l_M$: pitch or lead of helicoid thread 56

The above information $K_M$ is transmitted to the rear converter $R_C$ through a contact $t_1$, and then, to the camera body CB through a contact $t_2$. Accordingly, in the above case, the rear converter RC is provided with a lead wire 1 insulated from other portions as signal transmission means for transmitting the information $K_M$ as it is from the exchangeable lens assembly EL to the camera body CB. However, the transmission system of the information $K_M$ is not necessarily limited to the above example, and may be modified, for example, to such a system wherein the exchangeable lens EL and the camera body CB are directly connected to each other by an electric cord or the like, in which case, the signal transmission means 1 is not required for the rear converter RC. Meanwhile, in the case where a mechanical signal member such as a projection or the like is provided in the exchangeable lens assembly EL in place of the ROM 58, it may be arranged in such a manner that a mechanical signal transmitting means to be displaced by said signal member is provided in the rear converter RC, whereby the information of $K_M$ is detected at the camera body CB based on the displacement of the mechanical signal transmitting means.

Before describing the functions of the arrangement as described so far, the functioning in the case where only the exchangeable lens assembly EL is attached to the camera body CB will be explained hereinbelow.

In the example to be described here, the focusing optical system LE of the exchangeable lens assembly EL is of the whole lens system shifting type with the value $\kappa_M \approx 1$, and consequently the relation is represented by $K_M = (l_M \cdot \mu_M)^{-1}$. Accordingly, in the case where the out-of-focus amount L is detected by the focus condition detection means 38, when the driving force output shaft 30 is rotated in the direction to eliminate the out-of-focus by $L \cdot (l_M \cdot \mu_M)^{-1}$, the focusing optical system LE is brought into an in-focus condition through the driven shaft 50, the driving force transmission system, and the helicoid threads 56 and 59.

On the contrary, as shown in FIG. 2, in the case where the rear converter RC is mounted between the exchangeable lens assembly EL and the camera body CB, the ratio of the shift amount of the focusing optical system $L_E$ to the out-of-focus amount is altered by the composition of the focusing optical system $L_E$ and the rear converter lens Lc. On the assumption that the ratio of the shift amount inherent in the overall optical system thus composed to the out-of-focus amount is represented by $\kappa_{Mc}$, the relation will be, $$\kappa_{Mc} = \left( \frac{f_M}{f_{Mc}} \right)^2$$

where
$f_M$: focal length of only exchangeable lens EL
$f_{Mc}$: composite focal length of exchangeable lens EL and rear converter RC In the above case, if the magnification power given by the rear converter RC is denoted by M, $f_{Mc} = M \cdot f_M$, and thus, the relation is $\kappa_{Mc} = M^{-2}$.

Therefore, the ratio $K_{Mc}$ of the number of revolutions of the driven shaft for the composite optical system to the amount of out-of-focus in this case will be represented by $$K_{Mc} = \frac{M^{-2}}{l_M \cdot \mu_M \cdot \mu c}$$

where $\mu c$: gear ratio of driving force transmission system for the rear converter. However, since only the above information of $K_M$ is introduced into the camera body CB, an error $\Delta L$ as follows undesirably takes place with respect to the out-of-focus amount L in the case where the present invention is not applied (i.e. in the case where $\mu c = 1$).

$$\Delta L = L(l_M \cdot \mu_M)^{-1} - L(M^2 l_M \cdot \mu_M)^{-1} = \frac{L}{l_M \cdot \mu_M} (1 - M^{-2})$$

For reducing such an error to zero, the relation may be set as $\mu c = M^{-2}$. More specifically, the gear ratio of the driving force transmission system within the rear converter RC is determined by the magnification power of the rear converter RC. For example, in the case of a telephoto converter with a magnification power of 2 times, the gear ratio $\mu c$ is set at $\frac{1}{4}$, while in the case of a wide angle converter with a magnification power at $\frac{1}{2}$, the gear ratio $\mu c$ may be is set at 4. However, owing to the fact that the evaluation of focusing is not of an absolute nature, with a certain difference present according to persons and conditions, and that the allowable range for the focusing is not constant due to presence of depth of field according to aperture values and focal lengths, the relation need not necessarily be precisely $\mu c = M^{-2}$, but may be approximately $\mu c = M^{-2}$.

In the rear converter RC as described in the above embodiment, since the gear ratio $\mu c$ of the driving force transmission system between the intermediate driving force output shaft 8 and the intermediate driven shaft 6 is set as above, in the case where the out-of-focus amount L is detected by the focus condition detection means 38 at the camera body side CB, through rotation of the driving force output shaft 30 by the same amount as in the case where only the exchangeable lens EL is attached, the focusing optical system $L_E$ is shifted to the in-focus position via the intermediate driven shaft 6, driving force transmission system and intermediate driving force output shaft at the side of the rear converter RC, and driven shaft 50, driving force transmission system and helicoid threads 56 and 59, at the side of the exchangeable assembly EL.

By the rear converter according to the present invention as described so far, even when it is mounted between the exchangeable lens assembly and the camera body, there is no possibility that the shift amount of the focusing optical system of the exchangeable lens assembly becomes out of correspondence with respect to the out-of-focus amount. Moreover, since the minimum shift amount of the focusing optical system with respect to the unit driving amount of the driving motor is altered by the driving transmission system, an accurate automatic focusing may be achieved, even when the focus condition detection system in the camera body is either the phase difference system or the contrast system.

In the case where the exchangeable lens assembly has a signal of the value $\kappa_M$ described above which may be generally defined as the ratio of the driving amount of the driven member in the exchangeable lens assembly to the out-of-focus amount, if the signal transmission means for transmitting such signal to the camera body is provided in the rear converter, it is not necessary to provide a separate signal transmission means, so that the operation for connecting such signal transmission means to the exchangeable lens assembly and the camera body becomes unnecessary, with a further convenience for users.

Furthermore, if the value $\mu c$ which may be generally defined as the transmission coefficient of the drive transmission system for the rear converter is set so as to be approximately $M^{-2}$ when the magnification of the rear converter is denoted by M, it becomes possible to effect a still more accurate focusing.

In the second embodiment according to the present invention as shown in FIGS. 3 through 7, the constructions are generally similar to those of the first embodiment as described so far, except that the rear converter RC is provided with a signal transmission circuit 23 connected between contacts $t_1$ and $t_2$ by the lead wire 1. For better understanding, like parts in the first embodiment are designated by like reference numerals in the second embodiment to be described hereinbelow, while the detailed description of the constructions in the arrangement of the second embodiment is omitted here for brevity, since the description in the first embodiment may be entirely applied to the description of the second embodiment.

Figure 4:
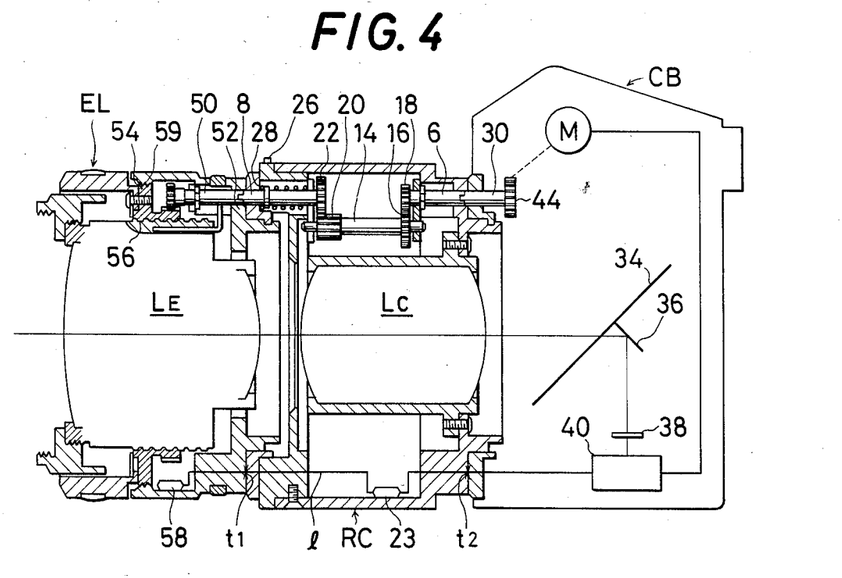
FIG. 4 is a side sectional view in which the rear converter of FIG. 3 is attached between the camera body and the exchangeable lens assembly.

As described above, the difference of the second embodiment from the first embodiment as illustrated in FIGS. 1 and 2 resides in that the rear converter RC is provided with the signal transmission circuit 23 having a predetermined transmission coefficient. The above signal transmission circuit 23 is connectable to the ROM 58 in the exchangeable lens assembly EL and the focus condition detection circuit 40 in the camera body CB as shown in FIG. 4 through contacts $t_1$ and $t_2$ respectively, and functions as one element for controlling the focusing optical system as stated later.

The information $K_M$ described earlier with respect to the first embodiment is directly introduced into the circuit 40 within the camera body, when the exchangeable lens assembly EL is attached to the camera body CB without inserting the rear converter RC therebetween, but in the case where the rear converter RC is interposed between the exchangeable lens assembly EL and the camera body CB, the information is introduced into the circuit 40 in the camera body CB after being converted into $\eta_c \cdot K_M$ by the transmission coefficient $\eta_c (\neq 1)$ of the signal transmission circuit 23 in the rear converter RC referred to above.

Figure 5:
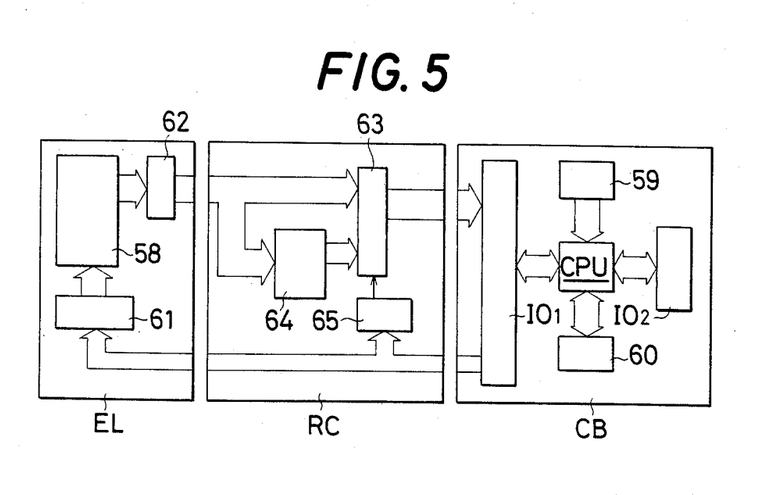
FIG. 5 is a block diagram illustrating circuit constructions at the sides of the rear converter of FIG. 3, and the exchangeable lens assembly and the camera body to which the rear converter is attached.

FIG. 5 shows the circuit constructions in the exchangeable lens assembly EL, rear converter RC and camera body CB. The circuit 40 within the camera body CB includes a central processing unit CPU, a lens input/output port $IO_1$, and a camera input/output port $IO_2$. The ROM 58 within the exchangeable lens assembly EL stores the above $K_M$ value, for example, in 6 bits, in the specific address thereof, while, in the other addresses, various information such as fully open aperture value information, minimum aperture value information, and focal length information, etc. of the exchangeable lens assembly are respectively stored. A ROM 59 within the camera body CB stores information inherent in the camera body, while a RAM 60 (Random access memory) memorizes information manually set in the camera body, but since ROM 59 and RAM 60 are not directly related to the present invention, detailed description thereof is omitted here for brevity.

Subsequently, of the circuit of FIG. 5 in the case where the rear converter RC is mounted between the exchangeable lens assembly EL and the camera body CB will be explained hereinbelow.

In the first place, the central processing unit CPU gives an instruction to the lens input/output port $IO_1$, and causes it to feed into an address bus, an address signal for designating an address in the ROM 58 in which the $K_M$ value is stored. This address signal is decoded by the address decoder 61, and the ROM 58 feeds out the data signal stored in the address designated thereby, i.e. the data signal in 6 bits showing the value of $K_M$, to the data bus. This data signal is simultaneously applied to an input selector 63 and a $K_M$ value conversion circuit 64 in the rear converter RC, through the buffer 62, and from the $K_M$ value conversion circuit 64, a data signal of 6 bits indicating the value of $\eta_c \cdot K_M$ is produced.

The input selector 63 selects the data signal directly input through the buffer 62 and the data signal input through the $K_M$ value conversion circuit 64, and, according to the signal from an address decoder 65, applies either one of the data signals to the data bus. Only in the case where the address signal designating the address of the ROM 58 in which the value of $K_M$ is stored, is produced in the address bus, the data signal input from the $K_M$ value conversion circuit 64, i.e. the signal representing $\eta_c \cdot K_M$ is output into the data bus. This signal is taken into the central processing unit CPU through the lens input/output port $IO_1$ so as to be stored in one of the internal registers.

Upon termination of the reading of the data signals as described above, the central processing unit CPU successively feeds an instruction to the camera input/output port $IO_2$ so as to cause the focus condition detection by the focus condition detection element 38 to be effected, and to take in the output thereof, and based on the output thus taken in, calculates the amount of out-of-focus (i.e. amount of deviation or displacement of an image plane from a predetermined image forming plane) indicating the focus adjusting condition at that time point and the direction thereof (i.e. whether front focus or rear focus), and then, have an internal accumulator to memorize the signal as the result of the above calculation. Subsequently, the central processing unit CPU calculates the number of revolutions N of the driving motor (M) and its direction of rotation, based on the signal stored in the accumulator and the data signal $\eta_c \cdot K_M$ previously memorized in the internal register, and if the relation is $N \neq O$, applies the signal showing the calculation result to the camera side input/output port $IO_2$ so as to cause the driving motor (M) to start rotation in the focusing direction, while having an internal register store the information of the number of revolutions N of the motor M thus calculated. The rotation of the driving motor (M) is monitored by an encoder (not shown), and a pulse produced by the encoder at every predetermined angle of rotation of the driving motor (M) is input to the central processing unit CPU. The central processing unit counts the pulses, and when the number of counted pulses reaches the value corresponding to the number of revolutions stored in the register as described above, applies a signal to stop the driving motor (M) to the input/output port $IO_2$.

In the case where the exchangeable lens assembly EL is directly mounted on the camera body CB, the central processing unit CPU takes in the data signal showing the value of $K_M$ from the ROM 58 within the exchangeable lens assembly EL, and from this signal and the signal showing the amount of out-of-focus due to focus condition detection and its direction, calculates the number of revolutions N of the driving motor (M) and its direction. Other functionings are exactly the same as those previously described.

Figure 6:
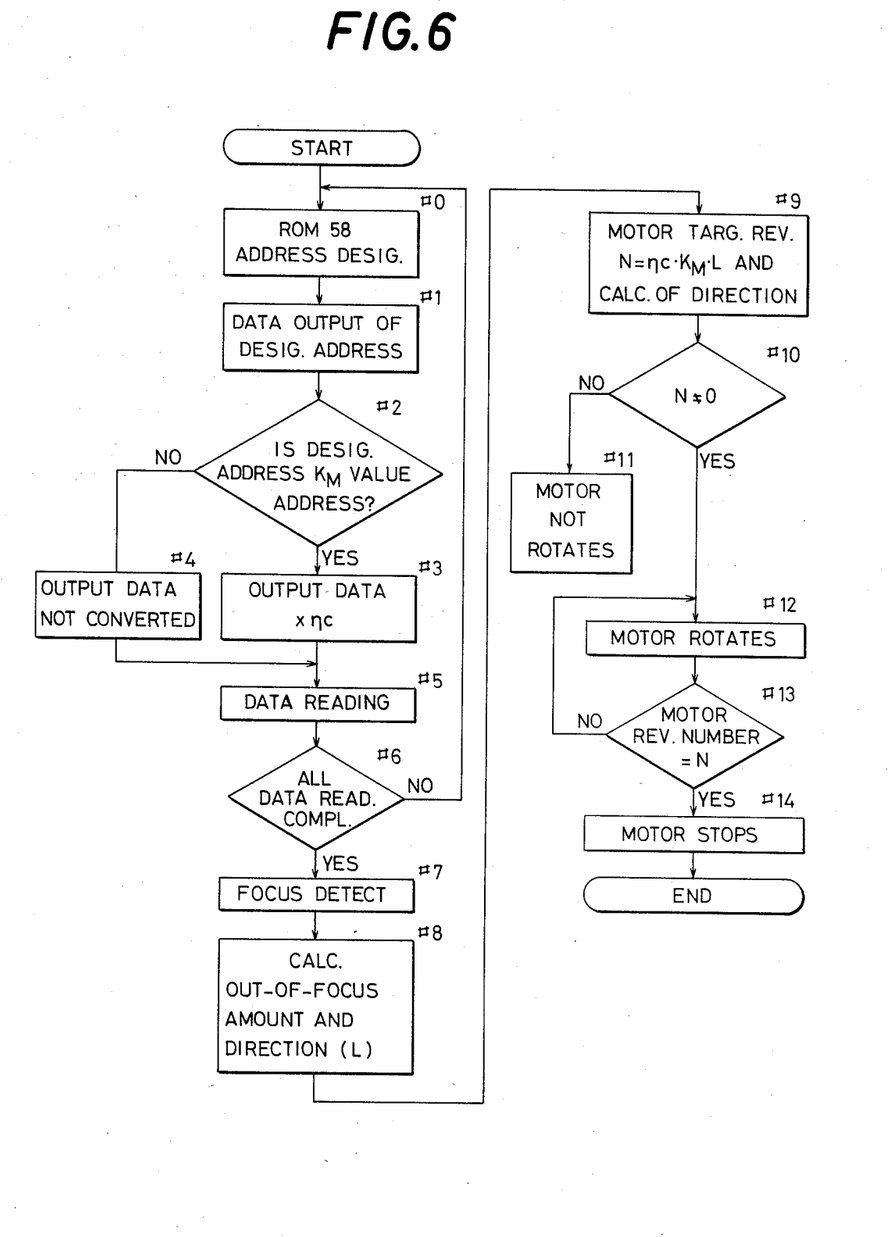
FIG. 6 is a flow chart showing the functions of the central processing unit.

In FIG. 6, the operations of the circuit shown in FIG. 5 are shown in the form of a flow-chart. In this flowchart, steps #0 to #6 mean to successively read a plurality of lens information from the ROM 58, in which steps, the reading of the above described data signal of $K_M$ and $\eta c \cdot K_M$ is included. Meanwhile, the steps from #0 to #6 are not required at each photographing, but may be effected, for example, upon turning on of a power switch (or when an exchangeable lens assembly or rear converter is mounted on the camera body), and thereafter, arranged to be repeated at every predetermined time interval. It is to be noted that after a step #14, the central processing unit CPU effects an exposure calculation, and subsequently, releases the shutter for starting the actual photographing.

Figure 7:
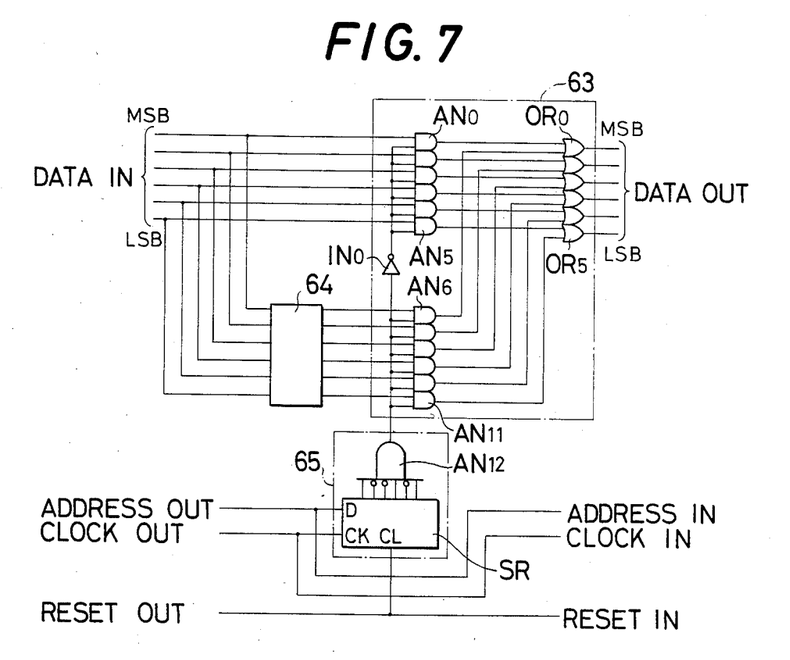
FIG. 7 is a block diagram showing a specific example of a circuit for the rear converter.

Referring also to FIG. 7 showing the detailed construction of the earlier stated circuit within the rear converter RC, the data bus includes six data lines, and transfer of data from the exchangeable lens assembly EL to the rear converter RC, and further, to the camera body CB, is to be simultaneously effected in a parallel relation. In the circuit arrangement of FIG. 7, the input selector 63 includes a set of AND circuits $AN_0, \ldots AN_5$, another set of AND circuits $AN_6 \ldots AN_{11}$, an inverter $IN_0$, and a set of OR circuit $OR_0 \ldots OR_5$. To the inputs at one side of the set of AND circuits $AN_0 \ldots AN_5$, data lines of the data bus are respectively connected, while, to the inputs at the other side thereof, output terminals of the address decoder 64 are connected through an inverter $IN_0$. On the contrary, to the inputs at one side of the set of AND circuits $AN_6 \ldots AN_{11}$, six output data lines of the $K_M$ value conversion circuit 64 are respectively connected, while, to the inputs at the other side thereof, the output end of the address decoder 65 is directly connected. Moreover, outputs of the set of AND circuits $AN_0 \ldots AN_5$ are connected to inputs at one side of the set of OR circuits $OR_1 \ldots OR_5$, and outputs of the set of AND circuits $AN_6 \ldots AN_{11}$ are connected to inputs at the other side of the set of OR circuits $OR_0 \ldots OR_5$, and thus, the outputs of these OR circuits $OR_0 \ldots OR_5$ become output ends of the data bus in the rear converter RC. Meanwhile, the address decoder 65 includes a shift register SR of six bits, and an AND circuit $AN_{12}$ of six bit inputs connected to the output of the shift register SR.

Upon input of clock pulses from the camera body CB, the shift register SR successively causes the output thereof to shift so as to reach an output state corresponding to the address signal. In FIG. 7, the address signal is a signal indicative of an address #41, and the output of the shift register SR ultimately becomes "101001", whereby a signal of "High" state is produced from the six bit AND circuit $AN_{12}$. Accordingly, the set of AND circuits $AN_6 \ldots AN_{11}$ are enabled, and the signals from the $K_M$ value conversion circuit 64 are output through the set of AND circuits $AN_6 \ldots AN_{11}$, and the set of OR circuits $OR_0 \ldots OR_6$. In the case where address signals other than the above are being produced, the output of the AND circuit $AN_{12}$ becomes "Low", and thus, the signals applied to the input selector 63 through the buffer 62 are output via the set of AND circuits $AN_0 \ldots AN_5$ and the OR circuits $OR_0 \ldots OR_5$.

Figure 8A:
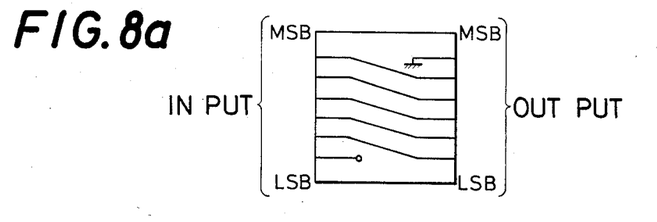
FIGS. 8a and 8b are circuit diagrams respectively showing specific examples of the $K_M$ value conversion circuits in FIGS. 5 and 7.
Figure 8B:
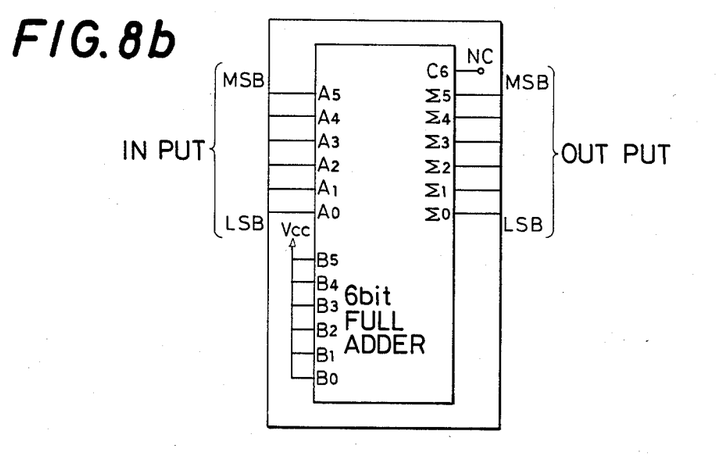

Reference is further made to FIGS. 8a and 8b showing specific examples of the $K_M$ value conversion circuit 64 in FIGS. 5 and 7. In the conversion circuit of FIG. 8a, output bits are connected with respect to input bits through deviation by one bit to the lower order, while the least significant bit LSB of the input is connected to a floating terminal, and the most significant bit MSB of the output is connected to a ground. Accordingly, on the assumption that the $K_M$ value to be input to this conversion circuit is, for example, "000110", a signal for "000011" is output from this conversion circuit, and this shows the value of $\eta c \cdot K_M$. In other words, the relation is $\eta c = \frac{1}{2}$ in this case. The conversion circuit of FIG. 8b is constituted by the use of a six bit full adder, as a subtraction circuit for subtracting 1 from the numerical value represented by the input. More specifically, the six bit complement "111111" of the subtracting value according to the binary system is input to $B_0$ to $B_5$.

With respect to a vari-focal zoom telephoto converter, in the case of FIG. 8a, the situation may be coped with by a device for shifting the $K_M$ value by $2^n$ times through a mechanical contact associated in movement with a zoom ring, while in the case of FIG. 8b, the state may be coped with by connecting $B_0$ to $B_5$ to a contact associated with the zoom ring.

Subsequently, description will be made as to how the above values $\mu c$ and $\eta c$ are set in the arrangement as described so far. In the present embodiment, the optical system of the exchangeable lens assembly EL is of the whole lens system shifting type in which the whole lens system includes the focusing optical system as described previously, and since $\kappa_M \approx 1$ in this case, the relation becomes $K_M = (pu \ 1M \cdot \mu Mpk)^{-1}$. Acdordingly, upon detection of the out-of-focus amount L by the focus condition detection means 38, if the driving force output shaft 30 is rotated by $L \cdot (1M \cdot \mu M)^{-1}$ in the direction to eliminate the out-of-focus, the focusing optical system LE is brought into an in-focus position through the driven member 50, drive transmission system, and helicoid threads 56 and 59.

On the contrary, when the rear converter RC is interposed between the exchangeable lens assembly EL and the camera body CB as shown in FIG. 4, the ratio of the shift amount of the focusing optical system LE to the amount of out-of-focus is varied through the composition of the focusing optical system LE and the rear converter lens Lc. When the ratio of the shift amount inherent in the overall optical system thus composed to the amount of out-of-focus is denoted by $\kappa_{Mc}$, the relation will be represented by $$\kappa_{Mc} = \left(\frac{fM}{fMc}\right)^2$$

where
fM: focal length only of the exchangeable lens assembly EL
fMc: composite focal length of the exchangeable lens assembly EL and rear converter RC
In the above relation, if the magnification power provided by the rear converter RC is denoted by M, the relation will be $\kappa_{Mc} = M^{-2}$, since $fMc = M \cdot fM$.

Accordingly, the ratio $K_{Mc}$ of the number of revolutions of the driven shaft to the amount of out-of-focus for the composite optical system in the above case may be represented by $$K_{Mc} = \frac{M^{-2}}{lM \cdot \mu_M \cdot \mu c \cdot \eta c}$$

where $\mu c$: gear ratio of drive transmission system for the rear converter. However, in the case where the present invention is not applied (i.e. in the case where $\eta c = 1$, $\mu c = 1$), an error $\Delta L$ is undesirably produced as follows with respect to the amount of out-of-focus, since only the above information of $K_M$ is introduced into the camera body CB, $$\Delta L = L(lM \cdot \mu_M)^{-1} - L(M^2 \cdot lM \cdot \mu_M)^{-1} = \frac{L}{lM \cdot \mu_M}(1 - M^{-2})$$

For reducing the above error to zero, it may be set as $\eta c \cdot \mu c = M^{-2}$. In other words, the product of the transmission coefficient $\mu c$ of the drive transmission system in the rear converter RC and the transmission coefficient $\eta c$ of the signal transmission system is determined by the magnification power of the rear converter. By way of example, in the case of a telephoto conversion lens unit having a magnification power of 2, the relation may be set as $\eta c \cdot \mu c = \frac{1}{4}$, and for this purpose, it may be so arranged, for example, that $\eta c = \frac{1}{2}$, $\mu c = \frac{1}{2}$ or $\eta c = \frac{3}{4}$, $\mu c = \frac{1}{3}$, the proper distribution of values for $\eta c$ and $\mu c$ may be suitably determined according to the individual characteristics of the exchangeable lens assembly and the conversion lens assembly. Similarly, in the case of a wide angle conversion lens unit with a magnification of $\frac{1}{2}$, the relation may be $\eta c \cdot \mu c = 4$, and it may be so arranged, for example, that $\eta c = 2$, $\mu c = 2$ or $\eta c = 8/3$, $\mu c = 3/2$. However, as described previously, owing to the fact that the evaluation of focus condition is not of an absolute nature, but there may be differences according to persons and conditions, and that the allowable range of the in-focus condition is not constant due to depth of field according to the aperture values and focal lengths, the relation need not necessarily be $\eta c \cdot \mu c = M^{-2}$ precisely, but may be approximately close to $\eta c \cdot \mu c = M^{-2}$. Upon interposition of a rear converter RC with a magnification power M between the exchangeable lens assembly EL and the camera body CB, the value for an effective aperture is multiplied by M, and the depth of field is also multiplied approximately by M. Therefore, even when the image plane displacement by the unit amount driving of the driving motor (M) is multiplied by M, the focusing accuracy is considered to be approximately equivalent to that in the case where only the exchangeable lens assembly EL is mounted on the camera body CB. Accordingly, the relation may be $\eta c \cdot \mu c = M^{-1}$, and from the above fact, it may be said that the focusing accuracy will not be appreciatively reduced, if $\eta c \cdot \mu c$ is selected to be a value between $M^{-1}$ and $M^{-2}$. This means that the relation is $M^{-2} \leq \eta c \cdot \mu c \leq M^{-1}$ for a telephoto converter and $M^{-1} \leq \eta c \cdot \mu c \leq M^{-1}$ for a wide angle converter.

By the above arrangement, in the case where the exchangeable lens assembly EL is mounted on the camera body CB through the rear converter RC as shown in FIG. 4, the driving force output shaft 30 rotates by $\eta c$ times as compared with the case where only the exchangeable lens assembly EL is mounted on the camera body CB through detection of the out-of-focus amount L by the focus condition detection element 38. (This is equal to a case where the unit driving amount of the motor (M) is multiplied by $\eta c$). Moreover, the above rotation is multiplied by $\mu c$ by the drive transmission system of the rear converter RC while it is transmitted to the intermediate driving output shaft 8 and the driven shaft 50 from the intermediate driven shaft 6. Accordingly, as compared with the case where only the exchangeable lens assembly EL is mounted on the camera body CB, the helicoids 56 and 57 move the focusing optical system LE by $\eta c \cdot \mu c$ times, and if $\eta c \cdot \mu c$ is set as described above, the focusing optical system LE is brought into an in-focus position.

Figure 9:
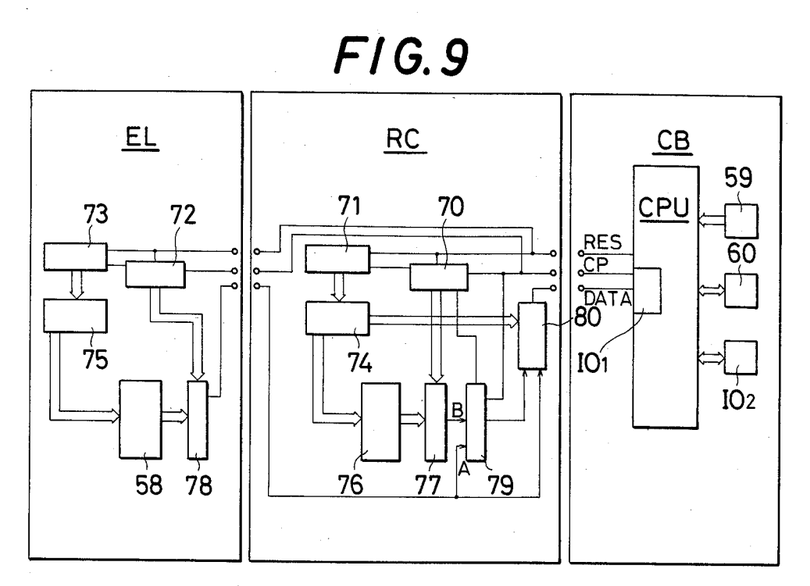
FIG. 9 shows circuit diagrams illustrating circuit constructions at the sides of a rear converter according to a third embodiment of the present invention, and the exchangeable lens assembly and the camera body to which the rear converter is attached.
Figure 10:
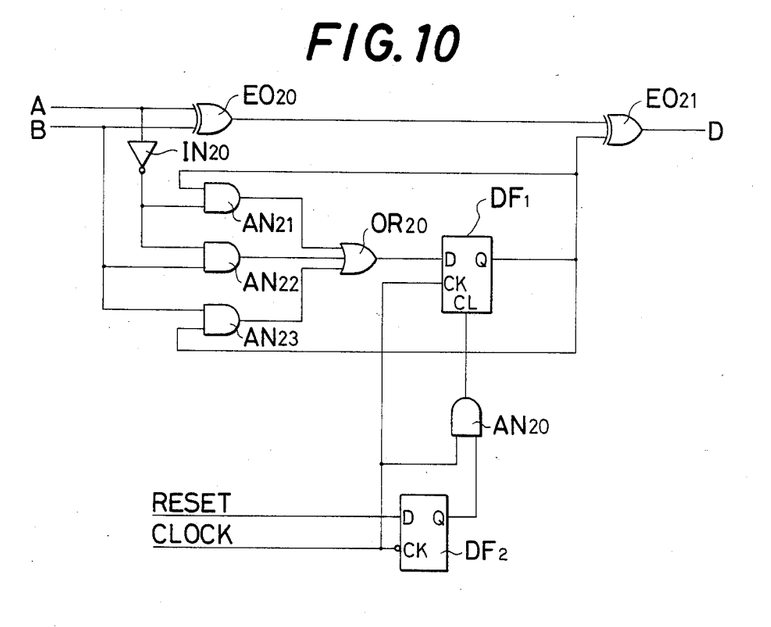
FIG. 10 is a circuit diagram showing a specific example of the $K_M$ value conversion circuit in FIG. 9.

Subsequently, reference is made to FIGS. 9 and 10 showing one example of a circuit construction for a signal transmission system in the rear converter RC according to a third embodiment of the present invention, and also examples of circuit constructions in the camera body CB and the exchangeable lens assembly EL in the above case. In the second embodiment as described earlier, the data signals are transmitted in a parallel relation among the exchangeable lens assembly, rear converter and camera body, but in this third embodiment, the data signals are subjected to time division so as to be transmitted serially. In this circuit, when the start signal is received through the input/output port $IO_2$, the central processing unit CPU first produces a reset signal. By this reset signal, a 3 bit binary counter 70 and a 4 bit binary counter 71 within the rear converter RC, and a 3 bit binary counter 72 and a 4 bit binary counter 73 within the exchangeable lens assembly, are reset, and upon completion of the above, the central processing unit CPU gives an instruction to start data reading to a serial input/output port $IO_1$. Then, clock pulses CP are produced from the input/output port $IO_1$, and respectively counted by the 3 bit binary counters 70 and 72. Each time eight clock pulses CP are counted, the counters 70 and 72 produce one pulse so as to be counted by the 4 bit binary counters 71 and 73 respectively. There are provided address decoders 74 and 75 for decoding the contents of the counters 71 and 73 into address signals of the ROM 76 and 58.

It is now assumed that the ROM 76 and 58 respectively store data of $\eta'c$, $K_M$ in the predetermined same address ($\eta'c$ is the data required for producing data signal for $\eta c \cdot K_M$ through calculation at a $K_M$ value conversion circuit to be described later). In this case, when the above address of ROM 76 and 58 is designated as the counting by the counters 71 and 73 proceeds, ROM 76 and 58 respectively apply data signals (6 bits) of $\eta'c$, $K_M$ to the data bus. These data signals are subsequently output through parallel/serial conversion circuits 77 and 78 from the upper bits to lower bits by time division every time the output states of the 3 bit binary counters 70 and 72 are altered, and input to input terminals B and A of the $K_M$ value conversion circuit 79 within the rear converter RC. From this $K_M$ value conversion circuit 79, a serial data signal of the value of $\eta c \cdot K_M$ is produced, and to an input selector 80, the above serial data signal of the value of $\eta c \cdot K_M$ and the serial data signal of the value of $K_M$ from the exchangeable lens assembly EL are applied. The input selector 80 outputs either of the inputs according to the control signal from the address decoder 74, and in this case, the address decoder 74 produces a control signal for causing the input selector 80 to select the signal from the KM value conversion circuit 79.

Accordingly, the central processing unit CPU takes in the data of $\eta c \cdot K_M$ at the serial input/output port $IO_1$, and causes the data to be stored in one of ihternal registers. Upon completion of the above data in-take, the central processing unit CPU outputs a focusing condition detection signal to the input/output port $IO_2$ within the camera so as to accept the output of the focus condition detection element 38 into the input/output port $IO_2$ within the camera, and by calculating the out-of-focus amount and the direction thereof, causes the signals indicating these to be stored in an internal accumulator. Subsequently, the central processing unit CPU calculates the revolutions N of the driving motor (M) based on the memorized data of the above internal register and accumulator, and has the value N memorized in the internal register, and simultaneously, provided instructions to the input/output port $IO_2$ within the camera for rotating the motor (M) according to the direction of the out-of-focus. The amount of rotation of this motor (M) is applied to the central processing unit CPU as the number of pulses from an encoder (not shown), and when the number of pulses becomes a value corresponding to the revolutions N memorized in the internal register, a stop signal for the motor (M) is produced from the input/output port $IO_2$.

In FIG. 9, in the case where the exchangeable lens assembly EL is directly mounted on the camera body CB without the interposition of the rear converter RC therebetween, the data of the $K_M$ value of the ROM 58 in the above description is directly taken into the serial input/output port $IO_1$ as a serial data signal.

FIG. 10 shows a specific example of the $K_M$ value conversion circuit within the rear converter RC in FIG. 9. In the circuit of FIG. 10, the data of $K_M$, $\eta'c$ are respectively input into the terminals A and B in order from the lower bit, and when a relation (input at terminal A)−(input at terminal B)=0−1 is produced at the lower bits, a D flip-flop $DF_1$ outputs "Borrow" to the Q output, on the basis of which the conversion of the $K_M$ value is effected.

Figure 11:
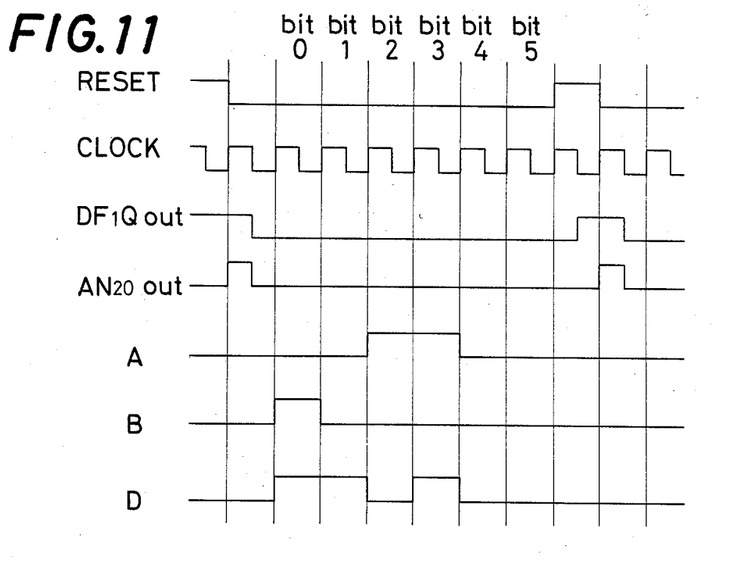
FIG. 11 is a time chart for signals at various parts of the $K_M$ value conversion circuit in FIG. 9.

The above function will be described more in detail with reference to the time chart of FIG. 11. In this example, $K_M = 001100$ and $\eta'c = 000001$, and it is assumed that, to the terminals A and B, signals of 001100 and 100000 are respectively applied in order from the lower bit through time division. At the time point prior to the input of the above signals by one clock, a reset signal is input, whereby the Q output of a D flip-flop $DF_2$ maintained "Low" from the time point for falling i.e. a negative edge of a subsequent pulse. Accordingly, since the output of an AND circuit $AN_{20}$ is also "Low", the D flip-flop $DF_1$ which has been cleared at each generation of the clock pulse CP, is not cleared any more.

In the above state, when "0" and "1" are respectively applied to the terminals A and B as the signals for the first bit, the signal at the terminal A is inverted through an inverter $IN_{20}$, and therefore, the output only of the AND circuit $AN_{22}$ of AND circuits $AN_{21}$, $AN_{22}$ and $AN_{23}$ becomes "High", with the output of an OR circuit 20 also becoming "High", so as to be input to the D input of the D flip-flop $DF_1$. The Q output of this D flip-flop $DF_1$ remains "Low" until a subsequent pulse is input. On the other hand, since an output of "High" is produced from an exclusive OR circuit $EO_{20}$, the output D of another exclusive OR circuit $EO_{21}$ becomes "High" after all at this time point. In synchronization with subsequent clock pulses, when signals "0" and "0" for the second bit are respectively applied to the terminals A and B, since the Q output of the D flip-flop $DF_1$ goes "High" at this time, the exclusive OR circuit $EO_{21}$ is maintained to be "High" in its output. In the above case, the output of the AND circuit $AN_{21}$ and that of the OR circuit $OR_{20}$ assume "High" state so as to be applied to the D input of the D flip-flop $DF_1$, and therefore, upon input of the subsequent clock pulse, the Q output of the D flip-flop $DF_1$ also goes "High".

When a signal "1" is applied to the terminal A and a signal "0" to the terminal B as signals for the third bit, the output of the exclusive OR circuit $EO_{20}$ becomes "High" with the Q output of the D flip-flop $DF_1$ being also made "High", and thus, the output of the exclusive OR circuit $EO_{21}$ becomes "Low". In this case, any of the outputs of the AND circuits $AN_{21}$ to $AN_{23}$ does not become "High", and accordingly, the Q output of the D flip-flop $DF_1$ is inverted to "Low" upon input of the subsequent clock pulse. Since input signals to the terminals A and B for the fourth bit are respectively "1" and "0", the output of the exclusive OR circuit $EO_{20}$ is "High" and the output of the D flip-flop $DF_1$ is "Low", and consequently, the output of the exclusive OR circuit $EO_{21}$ becomes "High". In the above case also, none of the outputs of the AND circuits $AN_{21}$ to $AN_{23}$ becomes "High".

Owing to the fact that signals of the terminals A and B for the fifth bit are "0" and "0", the output of the exclusive OR circuit $EO_{21}$ becomes "Low=0" thereby, and in this case also, none of the outputs of the AND circuits $AN_{21}$ and $AN_{23}$ becomes "High". Input signals for the sixth bit of the terminals A and B are also "0" and "0", and therefore, the output of the exclusive OR circuit $EO_{21}$ is also "Low".

Thus, when observed in terms of time series the output D of the exclusive OR circuit $EO_{21}$ varies as "110100" with time as shown in FIG. 10. Accordingly, the output signal is "001011", which is the value obtained by subtracting the stored value "000001" of the ROM 76 input to the terminal B, from the value "001100" of $K_M$ as applied to the terminal A. (i.e. $\eta c = 11/12$). It is to be noted here that the reset signal for resetting the D flip-flop $DF_1$ may be of the predetermined output at each eight clock pulses of the 3 bit binary counter 70 of FIG. 9. (For example, if "000" is assumed to be the reset signal, "001" . . . , "110" respectively correspond to the bit 0 . . . bit 5).

Figure 3:
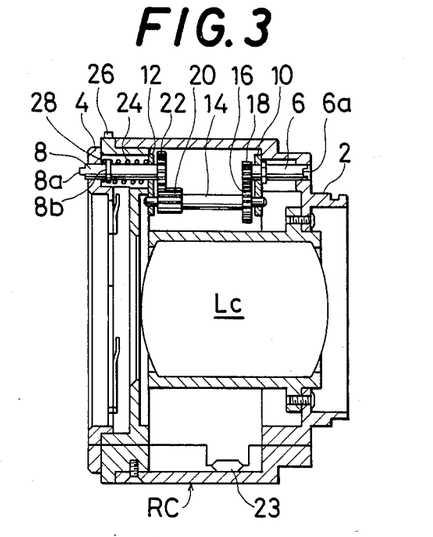
FIG. 3 is a side sectional view along an optical axis of a rear converter according to a second embodiment of the present invention.

Although the circuit constructions of the third embodiment according to the present invention have been described so far, the arrangement at the mechanism portion of the rear converter assembly RC is not different from that of the second embodiment shown in FIGS. 3 and 4. In the case of this third embodiment, it is possible to render the data read from the ROM 76 to be $\eta'c$ itself instead of $\eta c'$ as described above, depending on the construction of the $K_M$ value conversion circuit 79.

Figure 12:
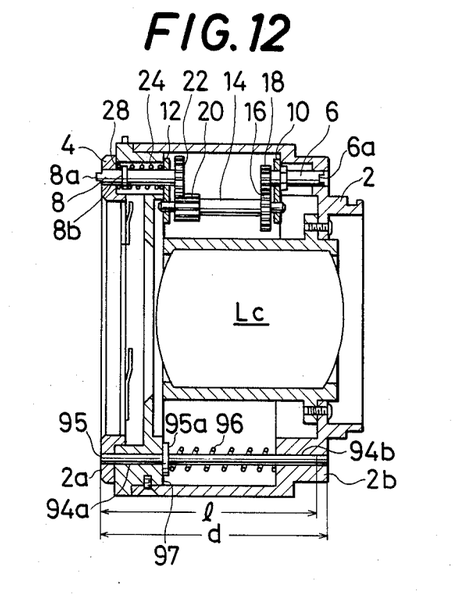
FIG. 12 is a side sectional view along an optical axis of a rear converter according to a fourth embodiment of the present invention.
Figure 13:
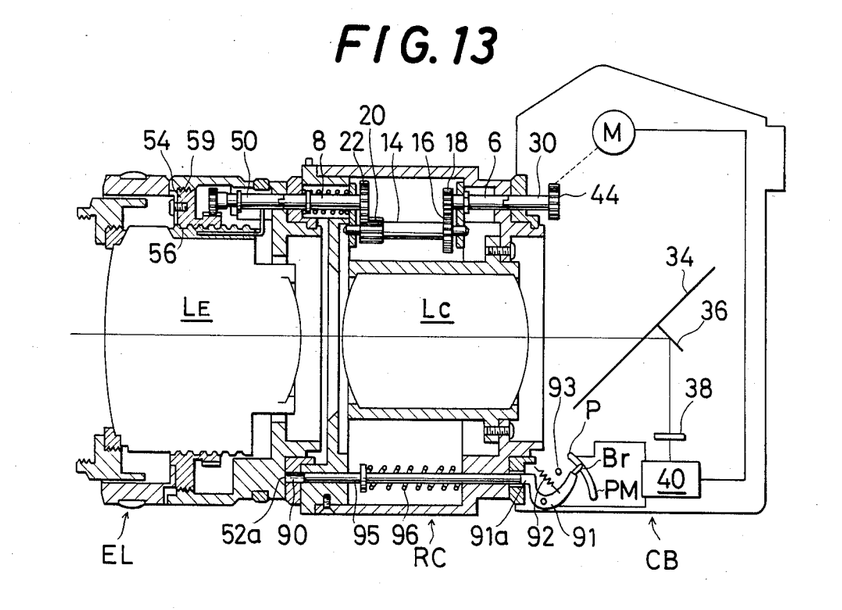
FIG. 13 is a side sectional view in which the rear converter of FIG. 12 is attached between the camera body and the exchangeable lens assembly.

Reference is further made to FIGS. 12 and 13 showing another embodiment of a rear converter assembly according to the present invention suitable for a lens exchangeable camera which is arranged to mechanically receive or transmit a $K_M$ signal without relying on electrical signals. More specifically, the exchangeable lens assembly EL is provided with a signal projection 90 whose amount of rearward projection from a mount surface 52a is determined according to $K_M$ value specific thereto, while, at the side of the camera body CB, there is provided a signal receiving lever 91 having an arm 91a at a position to be depressed by the signal projection 90. The above signal receiving lever 91 is normally urged by a spring 92 in a direction in which the arm 91a contacts a stopper 93, while the arm 91a is provided with a slider Br for a potentiometer PM. A circuit 40 has a detection means for detecting resistance values between the terminal P of the potentiometer PM and the slider Br as voltage values or current values.

The rear converter assembly RC has a signal transmission member 95 provided in axial bores 94a and 94b extending through front and rear mount faces 2a and 2b.

The above signal transmission member 95 has a length of $l=\eta c \cdot d$ when a distance between the front and rear mount faces 2a and 2b is represented by d, and is normally urged forwardly by a spring 96 so that, by the contact of its large diameter portion 95a with a stopper face 97, the end portion thereof is normally held flush with the mount surface 2a. It is needless to say that the transmission member 95 should be provided in such a position that it is axially aligned or overlapped with the signal projection 90 and the arm 91a of the signal receiving member 91 when the rear converter RC is correctly interposed between the exchangeable lens assembly EL and the camera body CB.

By the above construction, when the exchangeable lens assembly EL is mounted on the camera body CB through the rear converter RC, the signal projection 90 displaces the transmission member 95 rearwardly according to the amount of projection thereof, but since the transmission member 95 has the length $l=\eta c \cdot d$, the signal receiving member 91 has its arm 91a depressed by the transmission member 95, and is rotated clockwise by $\eta c$ times as compared with the cases where only the exchangeable lens EL is mounted on the camera body CB. Since the amount of clockwise rotation of the signal receiving lever 91 when only the exchangeable lens assembly is mounted on the camera body, shows the value of $K_M$ specific to the exchangeable lens assembly, such amount of clockwise rotation of the signal receiving lever 91 in the above case shows the value of $\eta c \cdot K_M$, which has been introduced into the camera body CB as the resistance value between the terminal P of the potentiometer PM and the slider Br. Thus, the resistance value is detected by the detecting means within the circuit 40 as the voltage value or current value, and according to the result of the detection and the result of the focus condition detection, the number of revolutions of the motor (M) and the direction thereof are determined by the circuit 40.

It should be noted here that in the above embodiment also, the constructions of the exchangeable lens assembly EL, rear converter RC and camera body CB other than those as described in the foregoing are generally similar to those in the first embodiment as shown in FIGS. 1 and 2, and therefore, detailed description thereof are omitted for brevity.

As is seen from the embodiments of the present invention described so far with reference to the drawings, the present invention may be applied also to a rear converter to be used for a camera body which employs a focus detection system of a contrast type. More specifically, in the above case, it may be so arranged that the motor (M) is driven stepwise (step motor or pulse motor driving), and the unit driving amount of a single step is determined by $\eta c \cdot K_M$. The construction of the rear converter itself may be the same even when the focus condition detection system in the camera body is either of the contrast system or phase difference system.

It is needless to say that, in the second and third embodiments, although control signal lines, power supply lines, common line, etc. are not particularly shown in FIGS. 5 and 9, electrical connections by such lines are necessary among the camera body CB, rear converter RC and exchangeable lens assembly EL in addition to the data bus and address bus, etc. as illustrated.

As is clear from the foregoing description, according to the arrangement of the present invention, even when the rear converter of the invention is interposed between an exchangeable lens assembly and the camera body, there is no such inconvenience that the proper correspondence between the shift amount of the focusing optical system and the amount of out-of-focus can not be achieved, while, owing to the fact that the minimum shift amount of the focusing optical system with respect to the unit driving amount of the driving motor is altered by the driving force transmission system, and simultanelusly, that the unit driving amount itself of the driving motor is also altered by the signal transmission system, a correct automatic focusing may be achieved even when the focus detection system in the camera body is either the phase difference system or contrast system. Moreover, since neither of the transmission coefficient $\eta c$ of the signal transmission system and the transmission coefficeint $\mu c$ of the driven force transmission system is equal to 1, it is possible to effect reasonable signal transmission or driving force transmission, as compared with the case where either $\eta c$ or $\mu c$ is of 1.

It is to be noted here that in the present invention, if the values of $\eta c \cdot \mu c$ are set so as to be between $M^{-1}$ and $M^{-2}$ when the magnification power of the rear converter is represented by M, an accurate focusing can be effected in the actual practice.

While the present invention has been described in detail so far with reference to the accompanying drawings, the present invention is not limited in its application to the embodiments as explained in the foregoing. By way of example, the optical system and circuit in the camera body CB for the focus condition detection may be replaced by the contrast system, in which case also, the present invention is clearly effective. More specifically, as described earlier, the problem that when the minimum shift amount of the focusing optical system of the exchangeable lens assembly is determined by the unit driving amount of the driving motor (M), the focusing optical system undesirably passes through the focusing region by the minimum shift from immediately before the focusing, may be effectively prevented in the present invention, since the minimum shift amount itself of the focusing optical system is altered to $M^{-2}$ times by setting $\mu c$ as described earlier.

In the foregoing embodiments, although the exchangeable lens assembly having a focusing optical system of the whole lens system shifting type has been raised as one example, even in cases of exchangeable lens assemblies having a focusing optical system such as a front group shifting type for shifting only the front group lenses during focusing, an internal focusing type for shifting only the intermediate group lenses, and a rear focusing type for shifting only the rear group lenses, etc., the variation of the value of $K_M$ by attaching the rear converter thereto becomes approximately equal to that of a whole lens system shifting type exchangeable lens assembly, and therefore, the rear converter of the present invention may be applied to the exchangeable lens assembles of all these focusing systems as described above. On the supposition that variations of the values of $K_M$ according to the shifted positions of the focusing optical system, i.e. photographing distances, are brought into question, it may be so arranged that, for example, the value of $K_M$ introduced from the exchangeable lens assembly to the camera body according to the shifted positions of the focusing optical system is altered stepwise so as to repeat the focusing condition detection in the course of shifting of the focusing optical system.

The drive transmission mechanism in the rear converter RC is not limited to that employing the gear train as in the foregoing embodiment, but may be altered to other known arrangements capable of speed reduction or speed increase. Similarly, the driving force output member of the camera body CB and the driven member of the exchangeable lens EL are not limited to the shaft type as in the foregoing embodiments, but may be replaced by those of other types, for example, a ring type, according to which, the constructions of the intermediate driven member and intermediate driving force output member of the rear converter RC may be altered to suit.

Furthermore, although the foregoing embodiments relate to the case where the driving force output member 30 and the intermediate driven member 6, and the intermediate driving force output member 8 and the driven member 50 constitute claw clutches, i.e. where the speed reduction ratio by such connecting portions is 1/1, it is possible to adopt the gear coupling as a method of coupling, and in that case, both the gear ratio at the coupling portion between the camera body and the rear converter, and the gear ratio at the coupling portion between the rear converter and the exchangeable lens assembly, may be treated as included in the gear ratio $\mu c$ of the driving force transmission system within the rear converter.

Furthermore, in the case where the exchangeable lens assembly is constructed as a zoom lens, it is so arranged that different values are read from the ROM 58 according to the zooming, since the above value of $K_M$ varies together with the zooming.

What is claimed is:

1. In an automatic focusing system for a lens exchangeable camera, in which an exchangeable lens assembly attachable to a camera body includes a focusing optical system, a driven member, a focusing mechanism for adjusting said focusing optical system in response to movement of said driven member and signal means for providing a data signal which is representative of the ratio of the image plane displacement by the adjustment of said focusing optical system to the movement of said driven member, and in which said camera body includes a focus condition detection means for detecting the focus condition of said focusing optical system to generate a focus condition signal, a driving member capable of being coupled with said driven member, a motor rotatable for driving said driving member, and a control circuit for controlling the rotation of said motor in response to said focus condition signal and said data signal so that said focusing optical system is brought into an in-focus condition by said focusing mechanism through the coupling between said driving and driven members, a conversion lens assembly adapted to be interposed between said camera body and said exchangeable lens, comprising:

a conversion lens unit having a predetermined magnification power M;

an intermediate driven member capable of being coupled with said driving member;

an intermediate driving member capable of being coupled with said driven member;

drive transmission means for transmitting movement of said intermediate driven member to said intermediate driving member with a predetermined transmission coefficient $\mu c$ to cause movement of said intermediate driving member the amount of which is the product of said transmission coefficient and the amount of movement of said intermediate driven member, said transmission coefficient $\mu c$ being larger than 1 when said magnification power M is smaller than 1, while being smaller than 1 when said magnification power M is larger than 1; and, signal transmission means for transmitting said data signal to said control circuit with a predetermined transmission coefficient $\eta c$ so that said control circuit receives said data signal multiplied by said transmission coefficient $\eta c$.

2. A conversion lens assembly as defined in claim 1, wherein said transmission coefficient $\eta c$ equals 1.

3. A conversion lens assembly as defined in claim 2, wherein said signal transmission means includes an electric signal transmitting member.

4. A conversion lens assembly as defined in claim 3, wherein said transmission coefficient $\mu c$ approximately equals $M^{-2}$.

5. A conversion lens assembly as defined in claim 2, wherein said signal transmission means includes a mechanical signal transmitting member.

6. A conversion lens assembly as defined in claim 5, wherein said transmission coefficient $\mu c$ approximately equals $M^{-2}$.

7. A conversion lens assembly as defined in claim 1, wherein said transmission coefficient $\eta c$ does not equal 1.

8. A conversion lens assembly as defined in claim 7, wherein the product of said transmission coefficients $\mu c$ and $\eta c$ approximately equals $M^{-2}$.

9. A conversion lens assembly as defined in claim 7, wherein the product of said transmission coefficients $\mu c$ and $\eta c$ falls within the range $M^{-1} \leq \mu c \cdot \eta c \leq M^{-2}$ when said magnification power M is larger than 1 and falls within the range $M^{-1} \leq \mu c \cdot \eta c \leq M^{-2}$ when said magnification power M is smaller than 1.

* * * * *